United States Patent
Wait

(10) Patent No.: US 11,859,423 B2
(45) Date of Patent: Jan. 2, 2024

(54) COUNTER-BALANCED LIFT SYSTEM

(71) Applicant: Douglas Wait, Granger, IN (US)

(72) Inventor: Douglas Wait, Granger, IN (US)

(*) Notice: Subject to any disclaimer, the term of this patent is extended or adjusted under 35 U.S.C. 154(b) by 180 days.

(21) Appl. No.: 17/205,289

(22) Filed: Mar. 18, 2021

(65) Prior Publication Data
US 2021/0293067 A1 Sep. 23, 2021

Related U.S. Application Data

(60) Provisional application No. 62/991,293, filed on Mar. 18, 2020.

(51) Int. Cl.
*E05D 13/00* (2006.01)
*B60J 5/10* (2006.01)

(52) U.S. Cl.
CPC .......... *E05D 13/1253* (2013.01); *B60J 5/108* (2013.01)

(58) Field of Classification Search
CPC ............ E05D 13/1253; E05D 13/1261; E05D 13/1269; B60J 5/108; E05Y 2201/672; E05Y 2201/706; E05Y 2600/10; E05Y 2800/205; E05Y 2900/106; E05Y 2900/516; Y10T 16/84
USPC ............................ 16/401; 49/200; 160/191
See application file for complete search history.

(56) References Cited

U.S. PATENT DOCUMENTS

| | | | | |
|---|---|---|---|---|
| 3,311,159 A | * | 3/1967 | Stansberry | E05F 15/686 160/189 |
| 3,412,423 A | * | 11/1968 | Binns | E05D 13/1261 49/200 |
| 4,882,806 A | | 11/1989 | Davis | |
| 5,419,010 A | * | 5/1995 | Mullet | E05D 13/1261 160/191 |
| 5,768,828 A | * | 6/1998 | Wilson | E05D 13/1253 49/386 |
| 5,865,235 A | * | 2/1999 | Krupke | E05D 13/1261 160/201 |
| 6,401,793 B1 | * | 6/2002 | Martin | E05D 13/1261 49/200 |
| 6,408,925 B1 | * | 6/2002 | Dorma | E05D 13/1261 49/200 |
| 7,234,502 B2 | | 6/2007 | O'Malley | |
| 7,343,958 B1 | | 3/2008 | East et al. | |
| 7,802,607 B2 | | 9/2010 | Crider | |
| 9,375,619 B2 | | 6/2016 | Beach et al. | |
| 9,487,984 B2 | | 11/2016 | Wachtell et al. | |
| 10,829,970 B2 | * | 11/2020 | Ehrlich | E05D 13/1261 |
| 2008/0196844 A1 | | 8/2008 | Diaz | |
| 2015/0083348 A1 | * | 3/2015 | Szczygielski | E06B 9/0638 160/190 |

* cited by examiner

*Primary Examiner* — William L Miller
(74) *Attorney, Agent, or Firm* — Ryan M. Fountain

(57) ABSTRACT

An adjustable length counterbalance mechanism for lift doors, frequently used for cargo trailers and garages. The adjustable length torque shaft of the counterbalance mechanism is able to accommodate many different lift door widths and is simpler to install than a fixed length torque shaft. In embodiments, the adjustable torque shaft is comprised of two outer torque shafts, each with a torsion spring and cable drum and a middle torque shaft that can be assembled together. The middle torque shaft can be inserted into each of the outer torque shafts to a selected depth to determine the length of the adjustable torque shaft.

11 Claims, 15 Drawing Sheets

COUNTER-BALANCED LIFT SYSTEM

CROSS-REFERENCE TO RELATED APPLICATIONS

This application claims benefit of the filing date U.S. Provisional Patent Application No. 62/991,293 entitled Counter-Balanced Lift System, filed on Mar. 18, 2020, which is herein incorporated by reference in its entirely.

BACKGROUND

Generally, overhead lift doors provide convenient and effective means for closing off large entrances including, but not limited to, garage doors and cargo trailers. Accordingly, lift doors are common in buildings, trucks and other transportation and storage facilities. There are a variety of lift doors including, but not limited to, ramp doors and roll-up doors, including multi-panel roll doors.

Conventional lift systems use springs to counterbalance the weight of the door, making the opening and closing of the lift door easier, safer, and more reliable. Cables are spooled around cable drums attached to each end of a torque shaft. The other ends of the cables are attached to each side the door, such that rotating the torque shaft wraps the cable around the cable drums raising or lowering the door, depending upon the style of door. U.S. Pat. No. 7,234,502B2 describes a counterbalance lift system in which torsion springs wrap around a torque shaft to offset the weight of the door. The torsion springs are attached to the shaft at one end of the spring, and to a fixed bracket at the other end of the spring. As the shaft rotates, during raising and lowering of the door, the torsion of the spring provides a counterbalance for the weight of the door. U.S. Pat. No. 7,343,958 also identifies a counterbalance lift system with a torque shaft that is mounted above an entranceway and rotates to raise and lower the door. Both of these patents describe a traditional lift door system used for garage doors. Each utilizes a single, elongated torque shaft that is mounted above the door opening. U.S. Pat. No. 9,487,984B2 describes a similar counterbalance lift system for trailers or trucks, also including a single shaft that spans the width of the door.

One problem with these conventional lift systems is that the torque shaft extends the full width of the door on which it is installed. This allows the cables of the counterbalance mechanism to be on either side of the doorway so that the cables can support the weight evenly on both sides of the door, allowing the door to raise and lower without the cables blocking the doorway. The doors are typically wide and there are multiple sizes of doors for different trucks and doorways. Manufacturers make counterbalance systems with varying lengths of torque shafts and distributers keep multiple systems of varying lengths in stock. The manufacturers and distributers have to gauge demand for the differing lengths of systems that consumers require. This can result in prolonged storage of the counterbalance systems, taking up significant floor space with unsold systems.

In an effort to address this issue, it is commonplace for suppliers of replacement counterbalance lift systems to stock the most frequently used, longest system and then have the consumer cut down the torque shaft to the desired length. This makeshift solution introduces two complications. The first complication is shipping cost. As noted, the counterbalance lift systems are long and narrow, much longer than the counterbalance lift system is wide or deep. Due to the length, the shipping containers are not standard, and, thus, the shipping of traditional counterbalance lift systems is expensive. The second complication is that the end consumer must alter the torque shaft to fit the desired fixed length. This requires expertise, time and expensive equipment that the consumer may not have.

BRIEF SUMMARY

The following presents a simplified summary in order to provide a basic understanding of some aspects of the claimed subject matter. This summary is not an extensive overview. It is not intended to either identify key or critical elements or to delineate the scope of the claimed subject matter. Its sole purpose is to present some concepts in a simplified form as a prelude to the more detailed description that is presented later.

A counterbalance mechanism for a lift door system is described herein, in embodiments, the counterbalance mechanism comprising an adjustable length torque shaft positionable above a lift door, wherein length of the torque shaft is selected to extend at least proximate to a width of the lift door. The mechanism also includes two cable drums mounted proximate to opposite ends of the adjustable length torque shaft for rotation with the torque shaft, the cable drums supporting flexible cables that connect to the lift door to support at least a portion of weight of the lift door. In addition, the counterbalance mechanism includes two torsion springs disposed around the adjustable length shaft and operably connected to the adjustable length torque shaft, wherein the two torsion springs exert a torsional force on the adjustable length torque shaft to counterbalance at least a portion of the weight of the lift door and assist in movement of the lift door, where each of the torsion springs are anchored to a mounting bracket.

Methods of installation for a counterbalance mechanism are described, including a method of installing a counterbalance mechanism for a lift door, comprising lifting an adjustable length torque shaft into a first and second mounting bracket, wherein the first and second mounting bracket are positioned above the lift door and at opposite sides of the lift door. In embodiments, the adjustable length torque shaft comprises a first outer torque shaft and a second outer torque shaft connected via a middle torque shaft, as well as a first and second torsion spring. The first torsion spring attached to the first outer torque shaft so that the first torsion spring is rotationally fixed to the first outer torque shaft and the second torsion spring attached to the second outer torque shaft so that the second torsion spring is rotationally fixed to the second outer torque shaft. The adjustable length shaft also includes a first cable drum attached to the first outer torque shaft and a second cable drum attached to the second outer torque shaft. The method of installation includes connecting the second end of the first torsion spring to the first mounting bracket, connecting the second end of the second torsion spring to the second mounting bracket, attaching a cable to each of the cable drums with the other end of the cable attached to the lift door, and adjusting tension on the first and second torsion springs to offset weight of the lift door.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

The systems, devices and methods may be better understood by referring to the following description in conjunction with the accompanying drawings, in which like numerals indicate like structural elements and features in various figures. The components in the figures are not necessarily to scale, and simply illustrate the principles of the systems, devices and methods. The accompanying drawings illustrate only possible embodiments of the systems, devices and methods and are therefore not to be considered limiting in scope.

DETAILED DESCRIPTION

Aspects of the system and methods are described below with reference to illustrative embodiments. The references to illustrative embodiments below are not made to limit the scope of the claimed subject matter. Instead, illustrative embodiments are used to aid in the description of various aspects of the systems and methods. This description, made by way of example and reference to illustrative reference, is not meant to be limiting as regards any aspect of the claimed subject matter.

Figure 1:
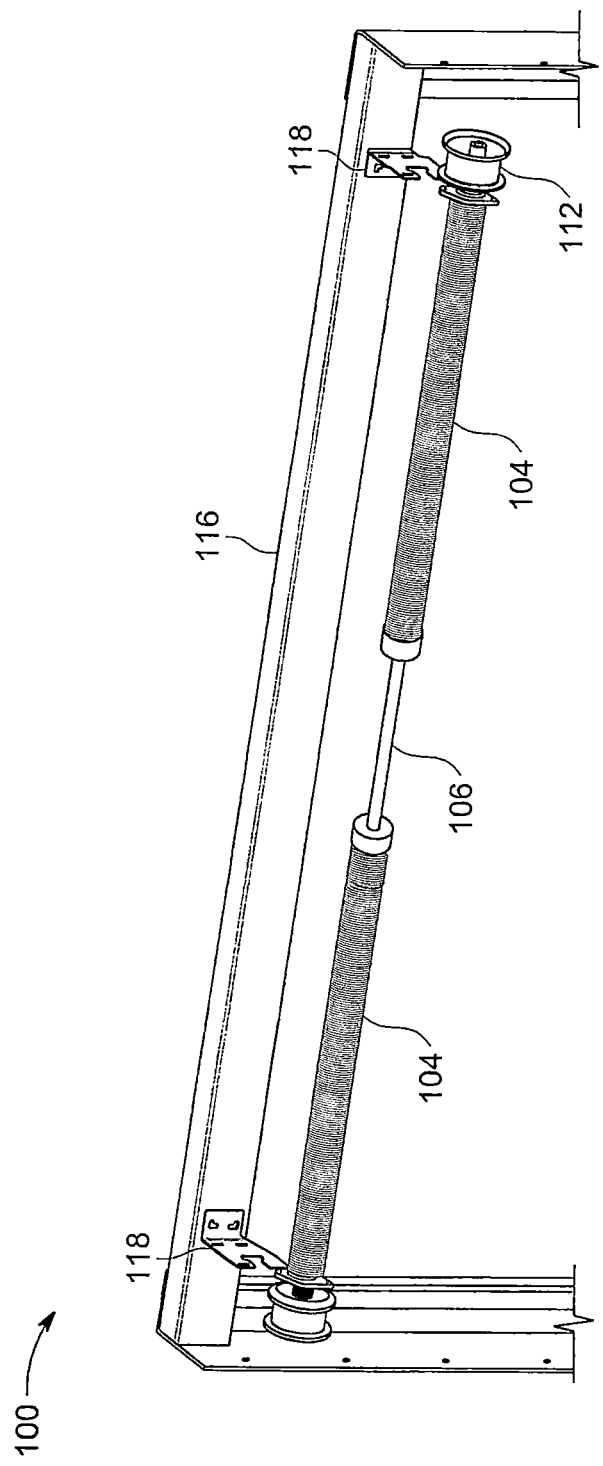
FIG. 1 depicts a perspective view of an embodiment of a counterbalance mechanism for a lift door prior to being mounted above a cargo trailer doorway.

Turning to FIG. 1, an embodiment of a counterbalance mechanism 100 for use with a lift door 102 is illustrated. Conventionally, counterbalance mechanisms 100 (also referred to herein as "counterbalance systems" or "lift systems") are mounted directly above the lift door 102 to which they are attached. Lift doors 102 are commonly used for cargo trailers, garage doors and numerous other applications as the door is conveniently lifted up and out of the way to open the doorway. In a typical lift system, there are one or two torsion springs 104 disposed around a single torque shaft that spans the width of the doorway. In this illustrated embodiment, the counterbalance mechanism 100 includes an adjustable length torque shaft 106 that can be customized to fit a variety of doorways without requiring cutting of the torque shaft 106 at installation. In embodiments, the adjustable length torque shaft 106 is comprised of two outer torque shafts 108 and one middle torque shaft 110 with the two torsion springs 104 disposed around the outer torque shafts 108. Here, the middle torque shaft 110 has a smaller diameter than the outer torque shafts 108 and can be inserted into ends of the outer torque shafts 108 to form the full adjustable length torque shaft 106. Length of insertion of the middle torque shaft 110 into the outer shafts can be selected to determine the overall length of the adjustable length torque shaft 106. The customizable nature of the adjustable length torque shaft 106 allows for use with a variety of lift doors 102 and the ability to disassemble the adjustable length torque shaft 106 and ship in its component parts, two outer torque shafts 108 and a middle torque shaft 110, greatly reduces shipping and storage costs.

As shown in FIG. 1, the counterbalance mechanism 100 has cable drums 112 on each end of the adjustable length torque shaft 106. Cables 114 are connected from each cable drum 112, to the corresponding side of the lift door 102 so that as the cables 114 wrap around the cable drum 112, the attachment points on the door 102 are lowered or raised, opening or closing the door 102 depending upon the style of door. For example, in a roll-up style of door, the cables 114 attach at the bottom of the door 102 so that as roll-up door is lifted and the bottom corners raised, the cables 114 spool onto the cable drums 112. Conversely, when a roll-up door is lowered, the cables 114 unspool from the cable drum 112.

Figure 2A:
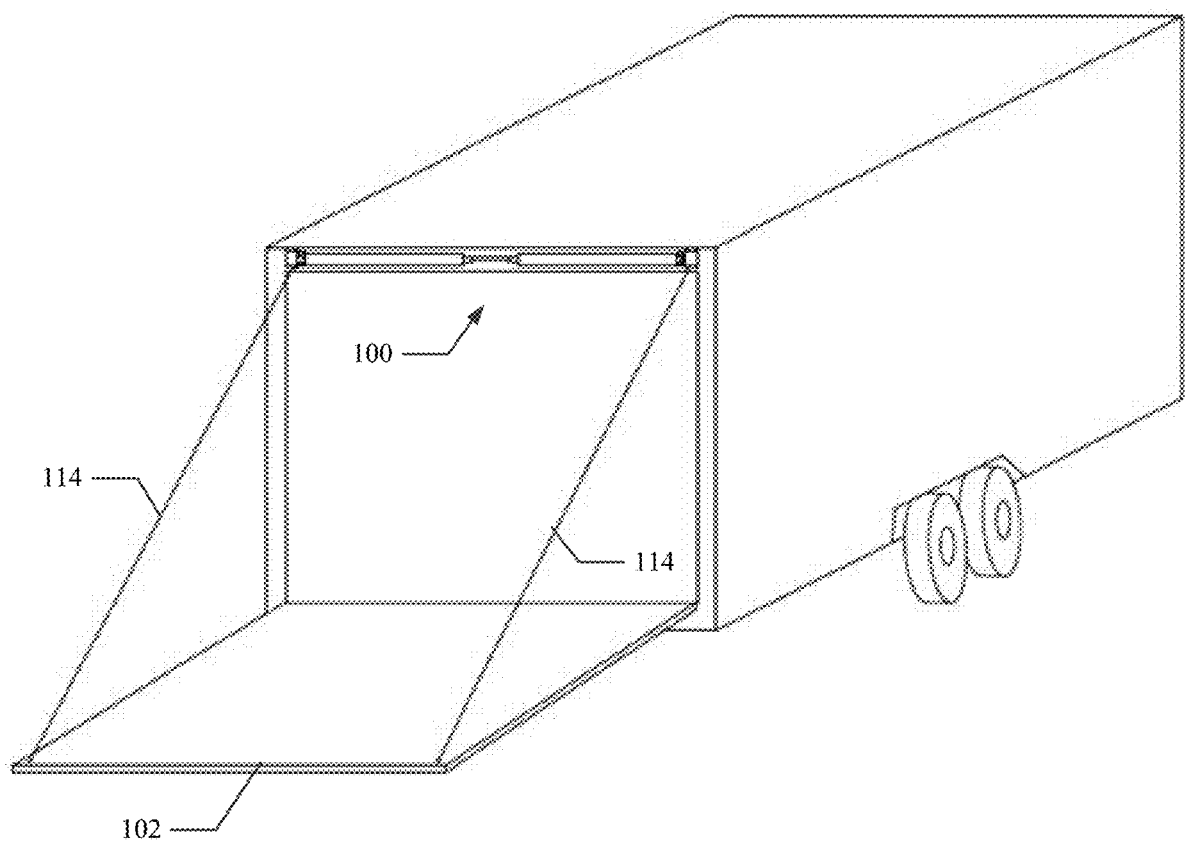
FIG. 2A depicts a perspective view of an embodiment of a counterbalance lift door mechanism for a lift door in normal use, lowering a ramp door for a cargo trailer.
Figure 2B:
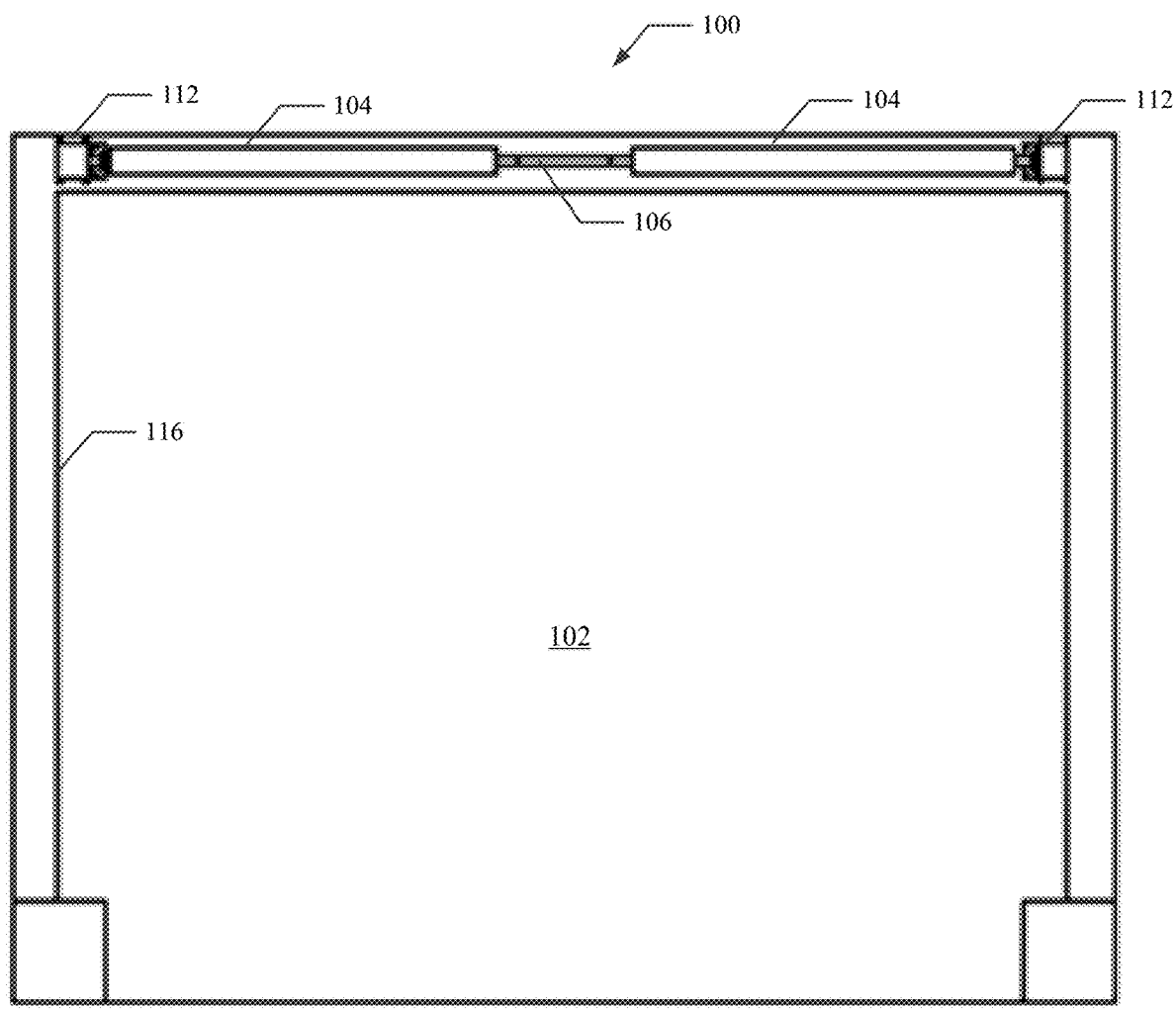
FIG. 2B depicts an embodiment of a counterbalance mechanism for a lift door from inside a cargo trailer with a ramp door fully closed.

Turning now to FIGS. 2A and 2B, the counterbalance mechanism 100 will be described herein generally with respect to a ramp door style of lift door. However, it can also be used with a roll up door style of lift door. As seen here, in a ramp door 102, the cables 114 are attached at the corners of what will be the top of the door 102 when the door 102 is in the closed position. As the ramp is raised, rotation of the torque shaft 106 will wrap the cables 114 around the cable drums 112, shortening the length of cable between the cable drums 112 and the corner of the door 102. The tension on the cable from the torsion spring 104 pulls the top of the ramp door 102 toward the counterbalance mechanism 100 and the top of the door frame 116, offsetting the weight of the ramp door 102. As the door 102 is lowered, the torque shaft 106 rotates in the opposite direction, unspooling the cable from the cable drums 112 and again, the torsion spring 104 on the torque shaft 106 offsets the weight of the door as the ramp door 102 is lowered. While the counterbalance mechanism 100 is shown in FIG. 2A for illustration purposes, in a typical system, the counterbalance mechanism 100 is installed inside the cargo trailer or doorway as shown in FIG. 2B.

FIG. 2B illustrates an embodiment of the counterbalance mechanism 100 installed over a door frame 116 in an interior of a truck. Installation in the interior of the truck or garage protects the counterbalance mechanism 100 from weather and interference. The cables 114 can extend beyond the truck to offset the weight of the lift door 102 and facilitate gradually lowering or raising the lift door 102.

Turning once again to FIG. 1, in the depicted embodiment of the counterbalance mechanism 100, the torsion springs 104 are installed on the outer torque shaft 108, one on each end of the outer torque shafts 108, and the outer ends of each torsion spring 104 are operably fixed to mounting brackets 118 that attach to the door frame 116 or wall. As discussed in greater detail below, in embodiments, the torsion springs 104 are fixed to the mounting brackets 118, where the bracket holds one end of the torsion spring 104 in a fixed position when the torque shaft 106 rotates with opening and closing of the lift door 102. The opposite end of the torsion spring 104 is connected to, and rotates with, the outer torque shaft 108. This rotation of the outer torque shaft 108 increases tension in the torsion spring 104 when it rotates in a first direction and releases tension in the torsion spring 104 when it rotates in the opposite direction. In a ramp door 102, the torque shaft 106 rotates to increase the spring tension as the ramp door 102 lowers so that the force of the torsion spring 104 slows the lowering of the ramp door 102, offsetting the weight of the door. The bias of the spring offsets the weight of the door 102, at least in part, assisting in controlling the lowering of the ramp door 102. Conversely, as the ramp door 102 is raised and the weight of the ramp door 102 supported by the cables 114 decreases, the torque shaft 106 rotates in a direction to reduce the tension on the torsion springs 104. Here, the bias of the spring offsets the weight of the door 102, assisting to lifting the door 102 into place and holding it in a closed position.

As shown in FIG. 1, counterbalance mechanisms 100 typically include a torque shaft 106 that spans the width of the door, supported on each side by a mounting bracket. Spanning the door allows the cables 114 to lift the door without blocking the entryway. Using a single torque shaft 106 allows for the use of two mounting brackets 118, one each side of the door 102, for a stable system. In the embodiment shown in FIG. 1. The counterbalance mechanism 100 includes a bearing assembly 120 that allows the torque shaft 106 to rotate once seated in the mounting brackets 118. In other embodiments, the bracket contains an integrated bearing, through which the torque shaft 106 is free to rotate.

As discussed above, there are problems and limitations presented by the traditional counterbalance system. One problem presented by the traditional system is that the torque shaft 106 must be a fixed length that matches the width of the lift door 102 on which it is installed. This can result in prolonged storage of multiple lift systems with various length torque shafts. In addition, torque shafts are long, narrow and unwieldy for shipping, increasing shipping costs. Many manufacturers currently ship their lift systems preassembled with the components all attached to the torque shaft. Because the torque shaft is a fixed length and sized to span the entire width of the door it is designed to lift, the resulting shipping containers are awkwardly sized as most shipping containers are significantly longer than they are wide. These types of shipping containers are expensive to ship.

To resolve the problem of multiple counterbalance systems with varying length torque shafts, distributors can sell a counterbalance mechanism 100 sized for a wide door, with the intent that their customers will cut the torque shaft down to the width of their particular door during installation. The consumer has to alter the system to the desired length themselves, an arduous process that will require that the consumer either to pay for a professional installer or acquire the costly equipment and devote the manpower to install the counterbalance system themselves. Of course, anytime the consumer is asked to cut down the torque shaft there is also the potential for a miscut or mismeasurement, causing wasted material and time, as well as consumer frustration and even potential injury.

The counterbalance mechanism 100 described herein solves these problems through an adjustable length torque shaft 106. In embodiments, the adjustable length torque shaft 106 can be shipped in its component pieces, two outer torque shafts 108 and a middle torque shaft 110, resulting in more reasonably sized shipping containers and reduced shipping fees. The configuration of the adjustable length torque shaft 106 allows a distributor or consumer to easily assemble the torque shaft 106 for installation and eliminates the need to cut the shaft. The ease of assembly greatly reduces the complexity of installation, reducing or eliminating special tools and potential mistakes and injuries. Finally, distributors can replace stocks of multiple counterbalance mechanisms with just the counterbalance mechanism 100 described herein as it can be used with a variety of door widths.

Figure 3:
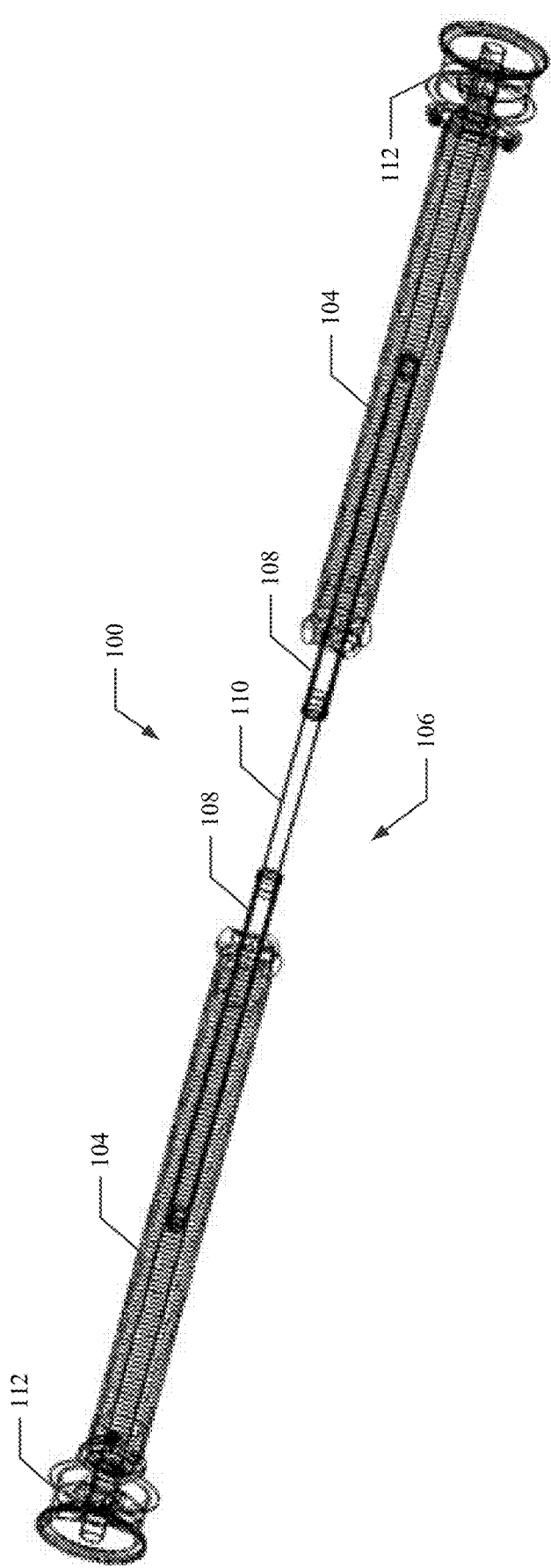
FIG. 3 depicts a perspective, wire frame view of an embodiment of a counterbalance mechanism for a lift door.
Figure 4:
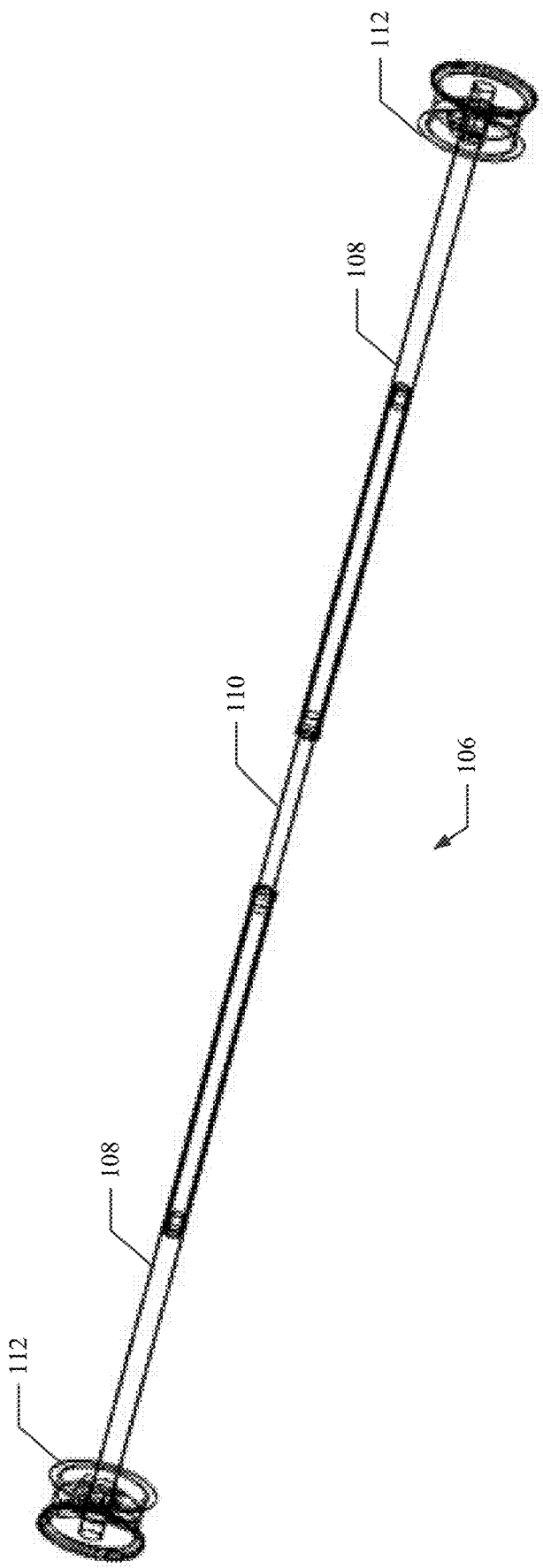
FIG. 4 depicts a perspective, wire frame view of an embodiment of an adjustable torque shaft with cable drums.

Referring now to FIGS. 3 and 4, a wire frame of an embodiment of a counterbalance system with an adjustable length torque shaft 106 is illustrated. FIG. 3 shows the counterbalance system with torsion springs 104 in place, while FIG. 4 removes the torsion springs 104 to better show the adjustable length torque shaft 106.

In an embodiment, the adjustable torque shaft 106 is made of three portions, two outer torque shafts 108 and one middle torque shaft 110. In an embodiment, the middle torque shaft 110 has a narrower diameter than the outer torque shafts 108. The outer torque shafts 108 can be standard sized for use with industry standard torsion springs 104 and cable drums 112. Maintaining standard sizing of the outer shafts would enable the adjustable length torque rod to be used interchangeably with traditional counterbalance systems, limiting expenses in manufacturing, assembly and installation of the described counterbalance mechanism 100. This has the additional advantage of facilitating use of the adjustable length torque shaft 106 and counterbalance mechanism 100 to repair or replace already installed counterbalance systems. In the depicted embodiment, the ends of the middle torque shaft 110 are inserted into each of the outer torque shafts 108 to form the complete adjustable length torque shaft 106. The middle torque shaft 110 is positioned between, and inserted into, the right and left outer torque shafts 108, but is not necessarily located precisely at the midpoint between the outer torque shafts 108. In embodiments, the outer torque shafts 108 can be made of steel or any other suitable material. In an embodiment, the outer torque shafts 108 are approximately 1 inch in diameter; however, the counterbalance mechanism 100 can include torsion shafts with diameters greater or less than 1 inch. Similarly, the middle torque shaft 110 can be made from steel or any other suitable material and have a diameter of ¾ inch; however, middle shaft can have a diameter of greater or less than ¾ inch.

In embodiments, the middle torque shaft 110 is held in place through a set of bushings. An internal bushing 122 is located at each end of the middle torque shaft 110 and acts as the interface with the outer torque shafts 108, potentially reducing vibration and allowing for independent rotation of the middle torque shaft 110 and the two outer torque shafts 108. Two flanged bushings 124 are positioned on the middle shaft to control insertion of the middle torque shaft 110 into each of the two outer torque shafts 108. The internal and flanged bushings can allow for rotation and provide support for the interface of the middle torque shaft 110 and the two outer torque shafts 108. In embodiments, the internal bushings 122 can be omitted and the middle torque shaft 110 and two outer torque shafts 108 can be connected using just the flanged bushings 124. In this embodiment, the flanged bushings 124 can be sufficiently long to establish a solid connection. In embodiments, the flanged bushings 124 can be greater than 2 inches in length. In still other embodiments, the middle torque shaft 110 and two outer torque shafts 108 can be connected via pins, clamps or other means to ensure that the shafts all rotate in unison.

Figure 5:
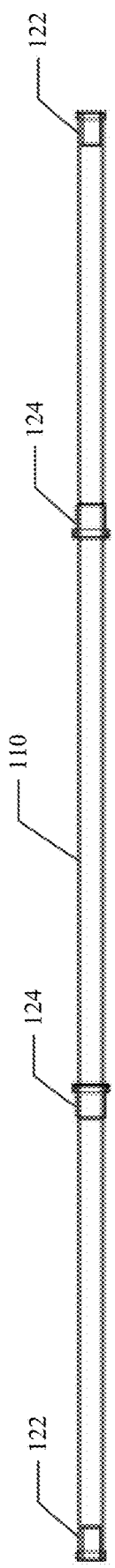
FIG. 5 depicts a perspective view of an embodiment of a middle torque shaft for an adjustable length torque shaft.

Referring to FIG. 5, an embodiment of a middle torque shaft 110 with bushings is shown in a wire frame view. In the depicted embodiment, the middle torque shaft 110 has a pair of bushings at or proximate to each end. As shown, the internal bushings 122 are inserted into the end of the middle torque shaft 110, with a lip of the internal pushing extending from the end of the middle torque shaft 110. The internal bushing 122 is sized to insert into an end of the outer torque shaft 108. The middle torque shaft 110 is inserted into the flanged bushings 124 to a desired position to control insertion of the middle torque shaft 110 into the outer torque shafts 108. Here, the lip or flange of the flanged bushings 124 are larger in diameter than the interior of the outer torque shaft 108 to prevent the middle torque shaft 110 from sliding too far into the outer torque shafts 108. The flanged bushings 124 can be moved to change the length of the assembled adjustable length torque shaft 106.

Figure 6:
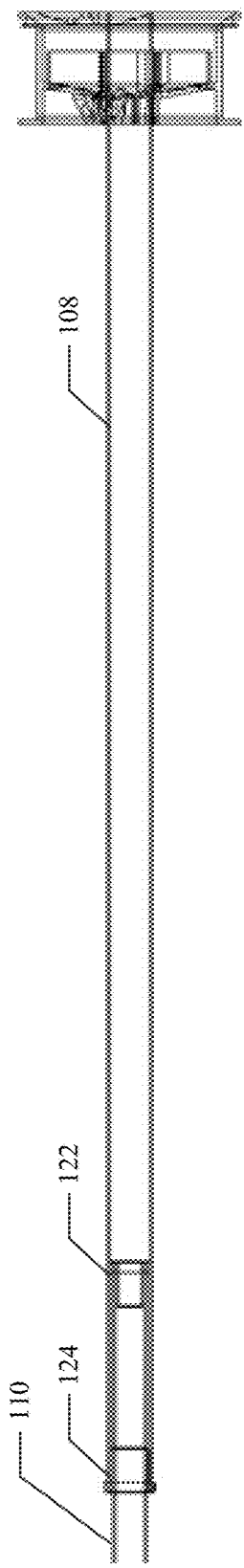
FIG. 6 depicts an embodiment of the adjustable torque shaft with minimal overlap between the middle torque shaft and the outer torque shaft.
Figure 7:
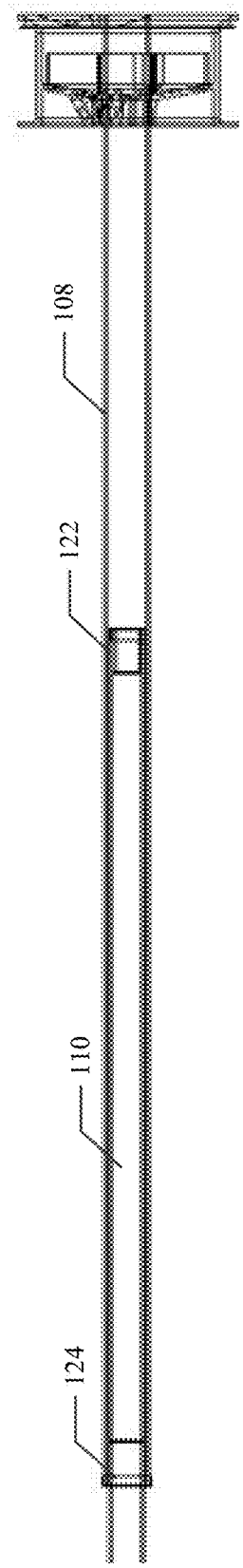
FIG. 7 depicts the embodiment of the adjustable torque shaft depicted in FIG. 8, with greater overlap between the middle torque shaft and the outer torque shaft, shortening the overall length of the adjustable length torque shaft.

Turning to FIGS. 6 and 7, in the depicted embodiment, the potential positions of the flanged bushing 124 are illustrated to vary the length of the adjustable length torque shaft 106. FIG. 6 depicts an end view of an embodiment of an adjustable torque shaft 106 with a flanged bushing 124 close to the internal bushing 122. In this embodiment, the outer torque shafts 108 would not cover much of the middle torque shaft 110, so the adjustable torque shaft 106 would be relatively long. In contrast, in FIG. 7, the location of the flanged bushings 124 can be adjusted to allow for the outer torque shaft to cover a large portion of the middle torque shaft 110. In this embodiment, the adjustable torque shaft 106 would be significantly shorter than that depicted in FIG. 6. While the depicted embodiment includes the internal and flanged bushings 124 at both ends of the middle torque shaft 110, it is possible to fix the middle torque shaft 110 to one of the outer torque shafts 108 on one side, allowing for the flanged bushing 124 and adjustment of length on only one side of the middle torque shaft 110.

The embodiment shown simplifies the counterbalance mechanism replacement process because a user can adjust the length of the overall torque shaft 106 by adjusting the location of the flanged bushing 124 to match the length of torque shaft being replaced rather than having to physically trim down a new torque shaft. This adjustable length torque shaft 106 can provide the stability and structure of a torque shaft spanning the width of the door 102 without many of the shortcomings of the fixed length torque shafts used in conventional systems. While the interface as described using simple bushings to connect the middle torque shaft 110 to the outer torque shafts 108, a variety of bearings, bushings, and other connection means are contemplated.

Figure 8:
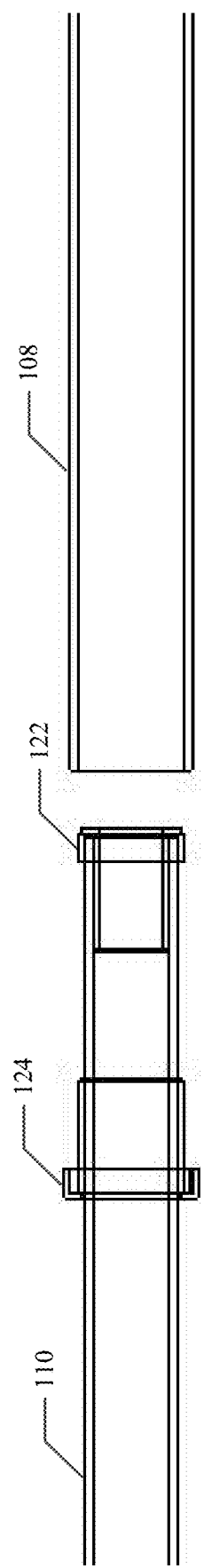
FIG. 8 is a wire frame view of an embodiment of a middle torque shaft and an outer torque shaft, positioned for connection.

Turning now to FIG. 8, an embodiment of the middle torque shaft 110 and an outer torque shaft 108 with the connection made by an internal bushing 122 and a flanged bushing 124 is depicted. In this embodiment, a user shifts the location of the flanged bushing 124 to adjust the length of the adjustable length torque shaft 106. Use of the bushings can dampen vibration where the parts of the torque shaft 106 connect. In addition, the illustrated embodiment can allow for independent rotation of the two outer torque shafts 108 and the middle torque shaft 110. As described in greater detail below with respect to the slack problem, where the length of the cables 114 is unequal between each side of the counterbalance mechanism 100. When the cables 114 are unequal, the door 102 may not open or close completely or operate smoothly. In a system with a fixed torque shaft, it is difficult to adjust the cable length. However, in the illustrated embodiments, cable length can be adjusted by rotating just one of the outer torque shafts 108 and its attached cable drum 112. Because the two outer torque shafts 108 can be rotationally decoupled, one cable can be adjusted without impacting the other cable.

Figure 9:
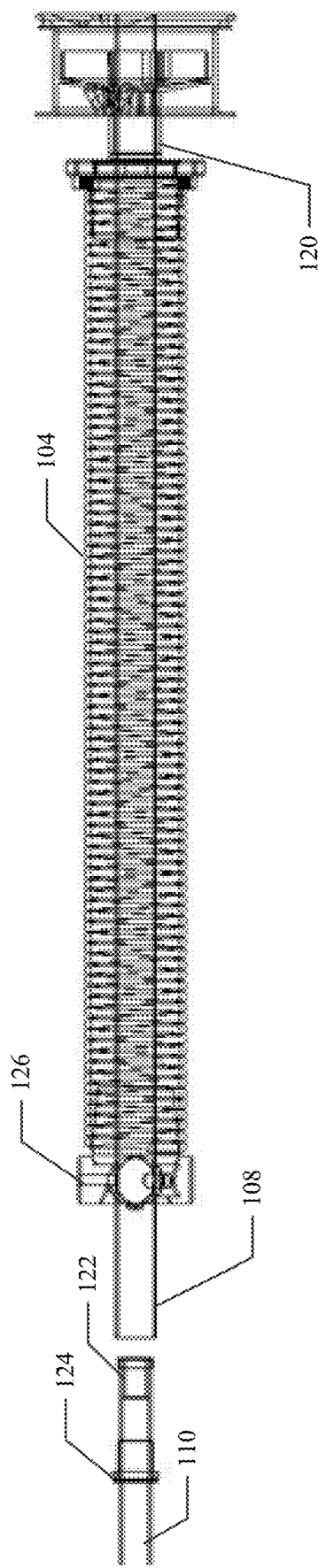
FIG. 9 is a wire frame view of the end of an embodiment of a middle torque shaft and an assembled outer torque shaft prior to insertion of the middle torque shaft.

Referring to FIG. 9, a wire frame view of an embodiment of a counterbalance mechanism 100 shows a torsion spring 104 disposed on an outer torque shaft 108. The torsion spring 104 is attached to a bearing housing and extends along the adjustable torque shaft 106 towards the center of the middle torque shaft 110. In the depicted embodiment, two torsion springs 104 are utilized and each torsion spring 104 is fixed to its own bearing housing on opposite ends of the adjustable length torque shaft 106. However, other embodiments can use a single torsion spring 104. In this embodiment, the bearing housing is seated in the mounting bracket when installed in a lift door 102. A bearing in the bearing housing allows the outer torque shaft 108 to rotate freely when the bearing housing, and its attached torsion spring 104, are fixed to the mounting bracket, shown in FIG. 10.

As depicted, the torsion springs 104 on each outer torque shaft 108 are fixed at the end proximate to the cable drums 112. In this embodiment, the torsion springs 104 are only operationally fixed at one end to create the rotational movement of the adjustable torque shaft 106 that decompresses or compresses the spring when the lift door 102 is opened or closed.

In embodiments, a winding cone 126 can be a solid, diecast piece of metal with a hole through its center configured to receive the adjustable torque shaft 106. In embodiments, a winding cone 126 can also have one or more bolt holes configured to receive a bolt. In these embodiments, the bolt hole would face a direction perpendicular to the direction of the adjustable length torque shaft 106 so that when a bolt was threaded through the bolt hole it would clamp onto the adjustable torque shaft 106, affixing the winding cone 126 to the adjustable torque shaft 106. The winding cones 126 can be made of steel, aluminum, or any other suitable material.

In the depicted embodiment, the end of the torsion spring 104 that is not attached to the winding cone 126 is affixed to the bearing housing. In this embodiment, winding cones 126 can have one or more integrated slots around its circumference, oriented so that each slot's opening faces a direction perpendicular to the direction of the adjustable torque shaft 106. These slots enable the manual winding of the torsion spring 104.

Figure 10:
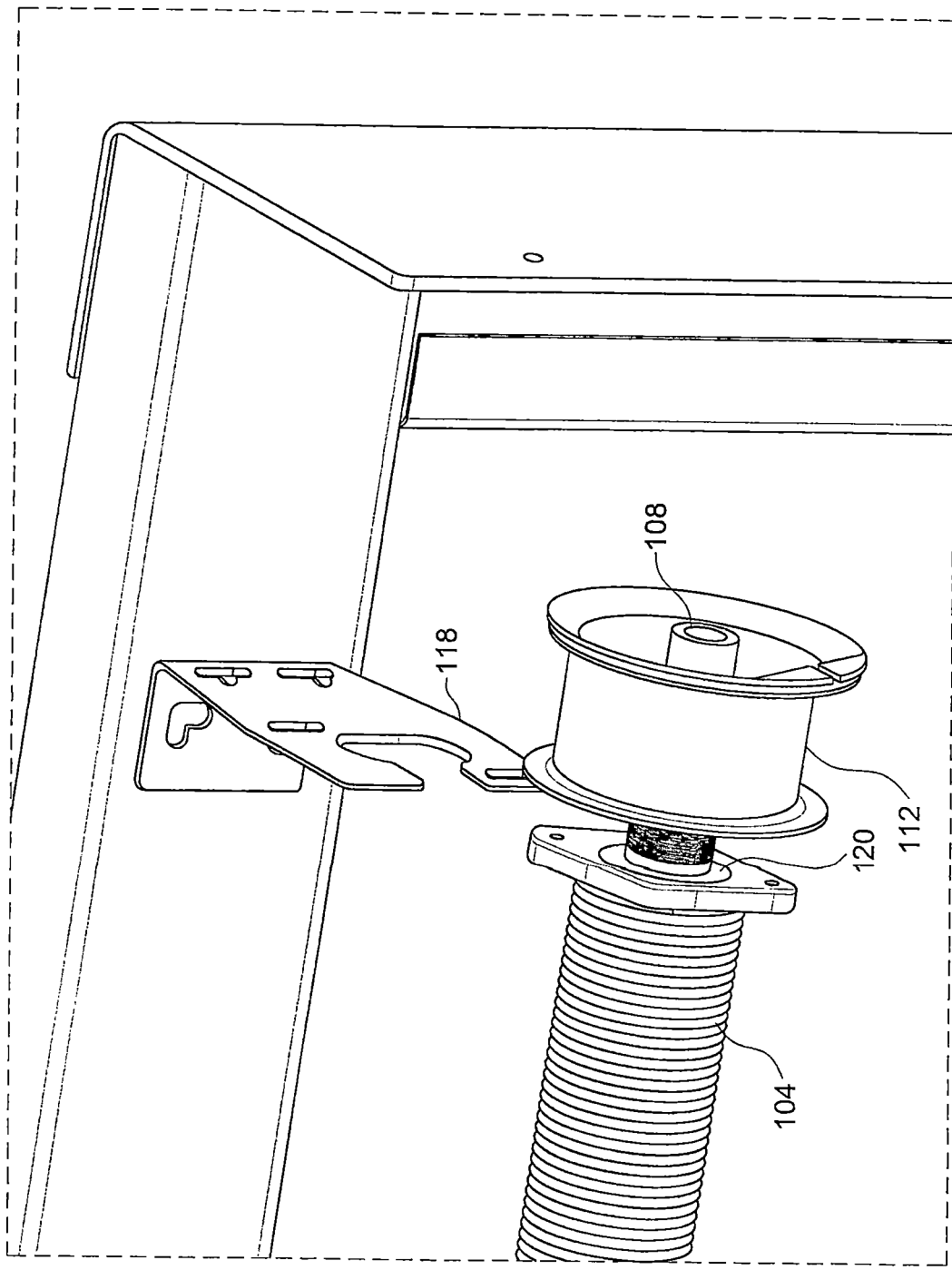
FIG. 10 depicts a perspective view of the end of an embodiment of a counterbalance mechanism for a lift door positioned to be inserted into a mounting bracket.

Turning to FIG. 10, a perspective view of an embodiment of a counterbalancing mechanism illustrates a bearing assembly 120 that connects the adjustable torque shaft 106 to the mounting brackets 118. In this embodiment, the counterbalance mechanism 100 includes an integrated bearing assembly 120 that facilitates installation, repair and replacement of lift systems.

Traditional systems frequently utilize mounting brackets 118 with integrated bearings. The mounting brackets 118 are the connection points between the lift system and the wall or truck interior on which the system is placed. The mounting brackets 118 hold one end of the torsion spring 104 in a fixed position and also suspend the mechanism above the door 102 at a distance from the surface from which it is attached. This is so the mechanism is free to rotate without contacting the door or wall surface. The torque shaft 106 runs through these bearings in the mounting brackets 118 so that the torque shaft 106 can rotate while the brackets remain fixed. Because the bracket contains an integrated bearing, it must be attached to the torque shaft 106 of the lift system at the time of manufacture. Because the brackets with the integrated bearing are attached to the counterbalance mechanism 100 at the time of manufacture, the entire counterbalance mechanism 100 is connected to the bracket as it is being installed on the wall or truck interior. This creates difficulties for the installer because the entire weight of the lift system must be supported while the bracket is attached to the wall or truck interior. This requires positioning the lift system at the top of the door 102, typically above the head of the installer. Traditionally for applications of the system in cargo trucks, the bracket is welded to the interior wall of the cargo area. Thus, installation of a traditional system requires two laborers. One laborer welds each bracket into place while the other must support the weight of the system while the welding is completed.

Alternatively, the bracket with the system attached can be welded to the interior wall before the truck's cargo area is assembled. For this installation method, the truck wall is placed flat, and the system is welded into place at some time prior to the truck wall being lifted into a vertical position. Although this method requires only one laborer, the attached system adds weight to the truck wall, making it more difficult to raise into position. Additionally, if a system breaks or otherwise requires replacement, the two-laborer installation method described above would need to be utilized.

In the embodiment illustrated in FIG. 10, the bearing assembly 120 allows the shaft to turn freely during the opening or closing of the lift door 102. As shown in the depicted embodiment, a bearing assembly 120 is adjacent to each the cable drum 112 on the adjustable torque shaft 106. The bearing assembly 120 can be comprised of a bearing housing and a bearing. In embodiments, the bearing housing can be a solid, diecast piece of metal with a hole through its center configured to receive a bearing. In the depicted embodiment, the bearing housing can have one or more bolt holes about its circumference configured to receive a bolt to enable the attachment of the bearing housing to a mounting bracket. When the mechanism is in operation, the bearing housing remains fixed to the mounting bracket, allowing the adjustable torque shaft 106, and elements attached to the adjustable torque shaft 106, to rotate freely, enabled by the bearing. The bearing housing can have a connection point configured to receive a torsion spring 104 on a side of the bearing housing opposite the side closest to the cable drum 112. The bearing assembly 120 can be made of steel, aluminum, or any other suitable material.

The cable drums 112 can have a connection point configured to receive a cable 114, and a notch in the outer edge of the drum 112 to guide the cable 114 onto the inner portion of the cable drum 112. The cable drums 112 can have grooves about their circumference to guide the wrapping of a cable 114. The cable drums 112 can be made from steel, aluminum, or any other suitable material.

Figure 11:
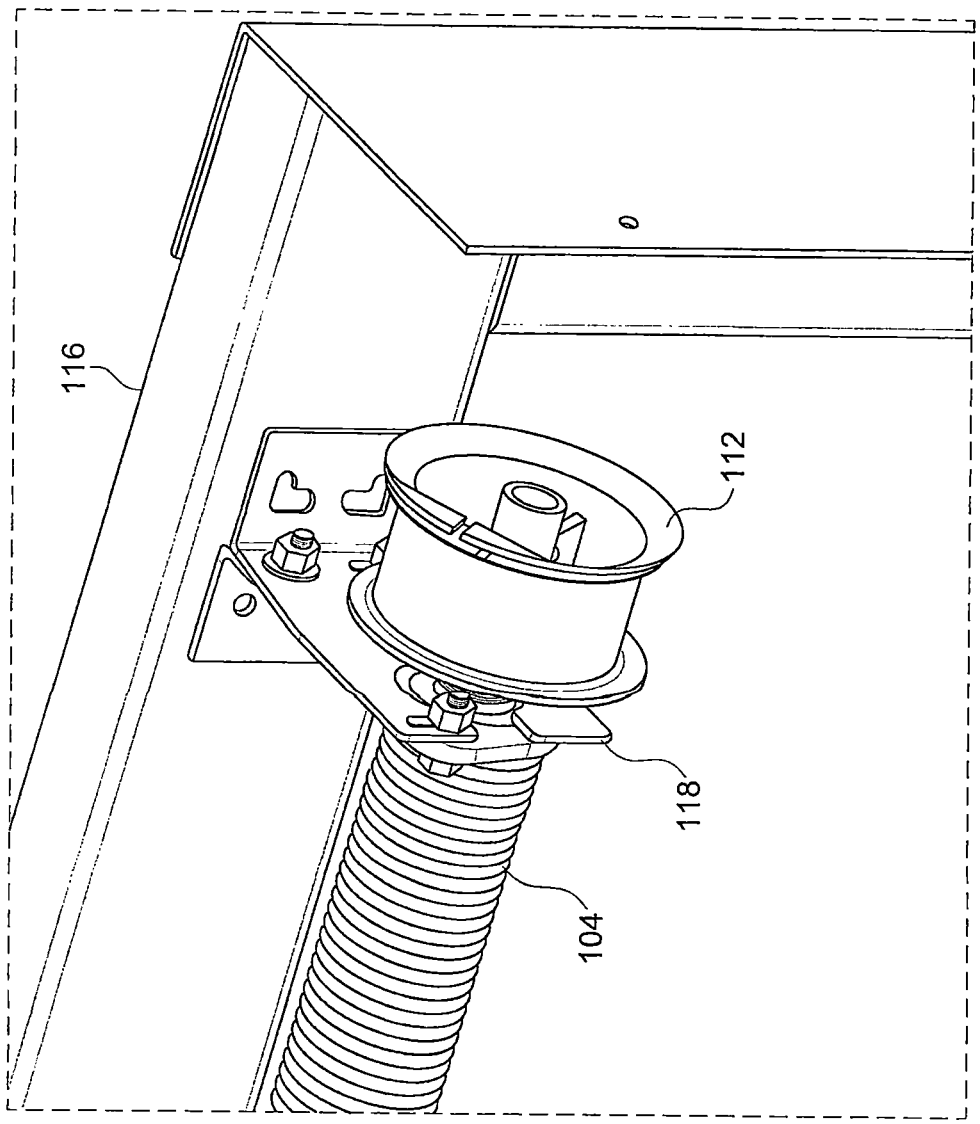
FIG. 11 depicts a perspective view of the end of an embodiment of a counterbalance mechanism for a lift door fixed to the mounting bracket.

In turning to FIG. 11, shows the end of the counterbalance mechanism 100 in place, in a mounting bracket. In another embodiment, the counterbalance mechanism 100 described herein includes a universal bracket separate from the bearing assembly 120, where the bracket has uniquely shaped receiving holes so that the brackets can be installed separately from the rest of the system and receive a variety of different mechanisms. A universal bracket separate from the bearing assembly 120 would allow for easier installation utilizing fewer laborers than what is needed to install a traditional system. Additionally, a universal bracket separate from the bearing would be able to accept different systems with a range of different bolt configurations. In particular, a universal bracket separate from the bearing could even accept a bracket with integrated bearings. This would allow for easier replacement of broken systems with systems from a variety of different manufacturers. It should be noted that while bolts are depicted to secure the mounting bracket and other features, other connection means can be used, such as screws, adhesives, or other suitable methods.

Turning once again to FIG. 10, the depicted embodiment shows that the outer torque shafts 108 extends outwards past the bearing assembly 120 to a cable drum 112 on each end of the adjustable torque shaft 106. In this embodiment, a cable is attached to each cable drum 112 with the other end of each cable attached to the lift door 102 as shown in FIG. 2A. The torsion springs 104 should now support the weight of the lift door 102 via the cables 114.

Figure 12A:
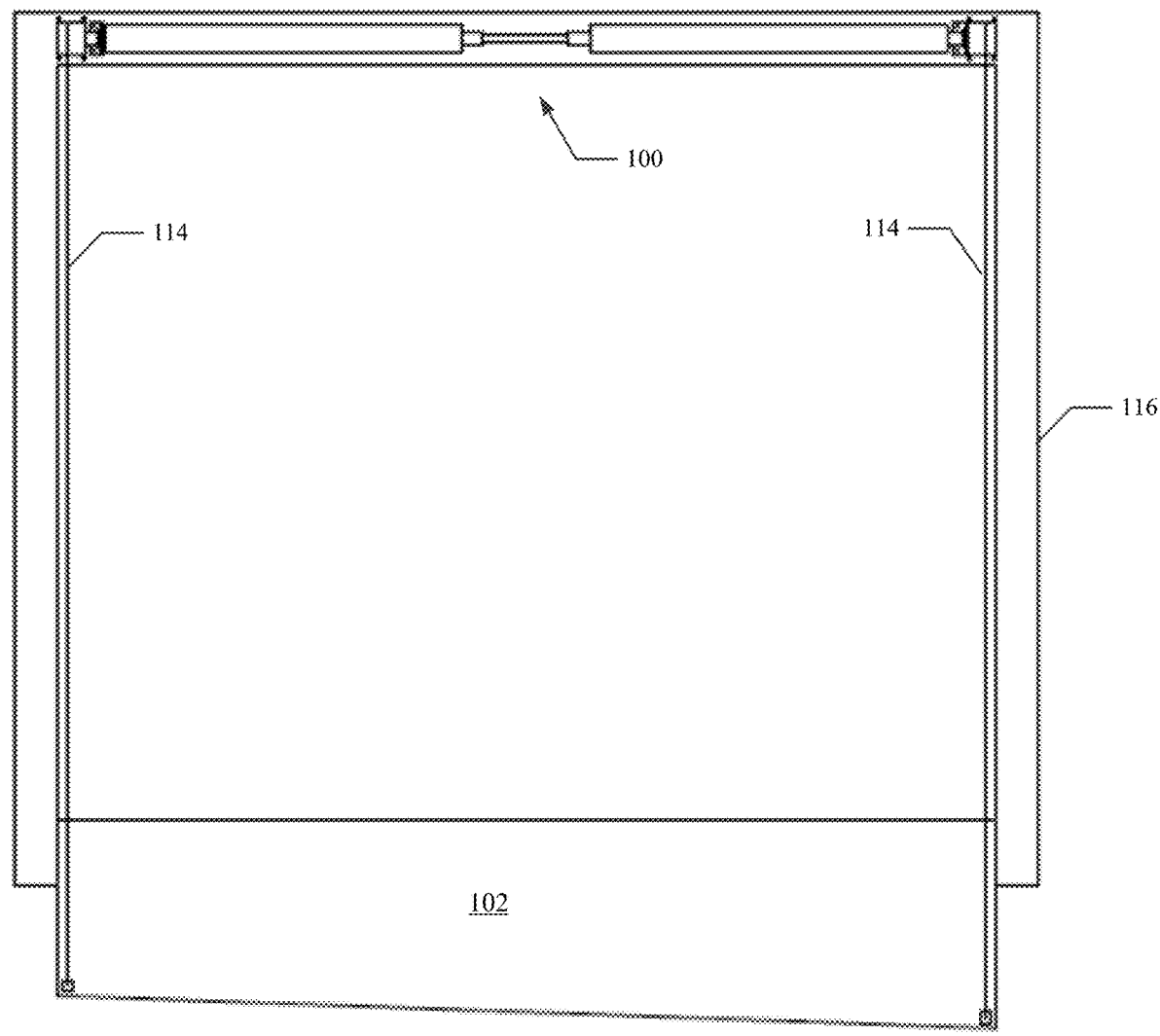
FIG. 12A depicts an embodiment of a counterbalance mechanism for a lift door in a cargo trailer with a slack problem.
Figure 12B:
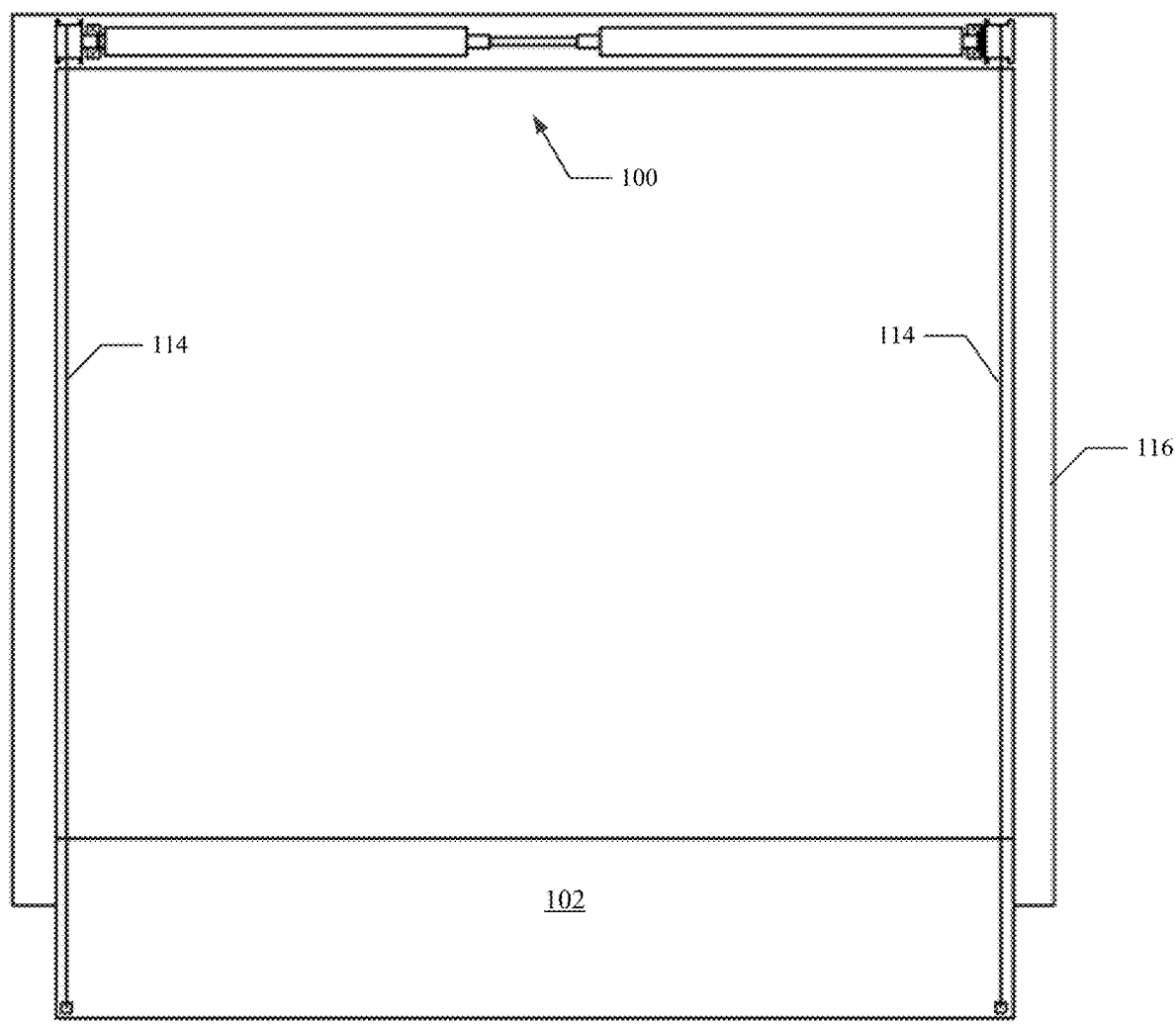
FIG. 12B depicts an embodiment of a counterbalance mechanism for a lift door in a cargo trailer with the slack problem resolved.

Referring now to FIGS. 12A and 12B, another problem can arise in certain lift systems, including but not limited to, ramp doors. When a counterbalance mechanism 100 is used to offset the weight of ramp doors, the door 102 may become have problems when opening or closing if the cables 114 become uneven. In typical operation, the lift door 102 is supported by both cables 114 evenly. If the cables 114 do not work in unison and one cable is longer than the other, then the door may not close completely and the slack in the cable can unwind from the drum. The extra or slack cable can interfere with or get tangled in the mechanism and the lift door. This is a challenging issue to fix because of the rotationally dependent nature of the cable drums 112 of the counterbalance lift door system created by the use of a singular torque shaft. This phenomenon is known as, and will be hereto referred to as, slack or a slack problem.

FIG. 12A shows a lift door system with a slack problem. Here, the cable on the right side of the illustration is longer than that on the left, causing an uneven ramp. When the door 102 is has a slack problem, the door 102 may become stuck in a half open position. As the cables 114 become unequal, the door 102 is no longer parallel to the ground because the weight from the door 102 shifts and the side with the longer cable, is lower than the other side. This causes the cable, and, thus, the torsion spring 104 of the lower side to be under more tension. In traditional systems, this problem is exacerbated by use of the single elongated torque shaft. The single elongated torque shaft of traditional systems has rotationally coupled cable drums 112 and therefore adjusting the cable via the cable drums 112 and torque shaft would effect both cables 114 equally. There are multiple reasons why cables 114 become uneven including, but not limited to, improper installation or repair, stretching of a cable or even cargo trailer being on uneven ground.

In the described counterbalance mechanism 100, where the outer torque shafts 108 can rotate independently, the problem of slack can be resolved by rotating a single outer torque shaft 108 to take up the slack in the cable. As described above, the middle torque shaft 110 is connected to the two outer torque shafts 108 via bushings, and while these bushings provide support to the adjustable length torque shaft 106 and provide the connection to stabilize the torque shafts, the bushings do not lock the outer torque shafts 108 together such that the entire shaft rotates together. As a result, the middle torque shaft 110 allows the outer torque shafts 108 to rotate without exerting force on the other outer torque shaft 108. Therefore, the adjustable length torque shaft 106 allows the cable drums 112 to rotate independently of one another. This independent rotation can be used to solve the slack problem as shown in FIG. 12B.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 13:
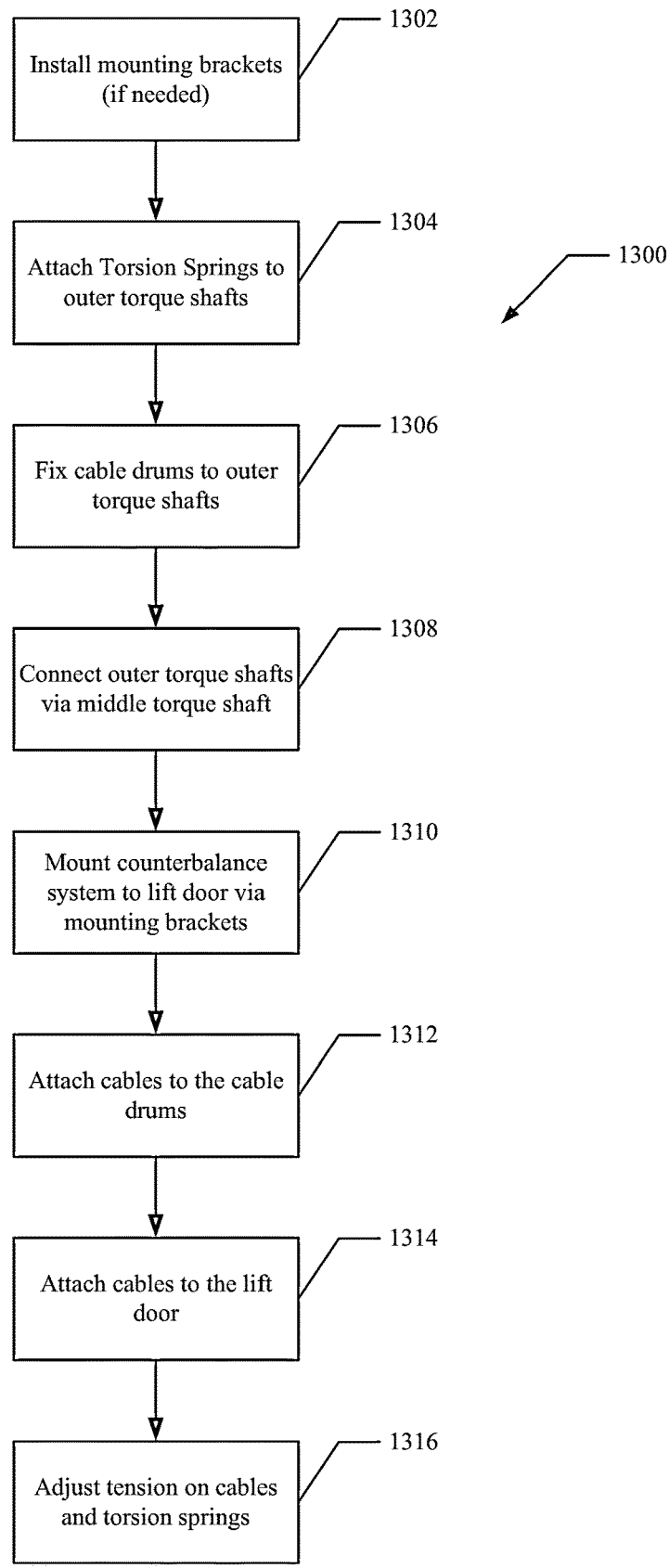
FIG. 13 is a flowchart illustrating a method for installing an embodiment of the counterbalance mechanism with a lift door.

Referring now to FIG. 13, an embodiment of a method for installing an adjustable length counterbalance mechanism 1300 is depicted. At step 1302, mounting brackets 118 can be installed, one at the top of each side of the doorway. If the counterbalance mechanism 100 is being installed in an existing lift door system, mounting brackets 118 may already be in place and this step can be omitted. It may be particularly advantageous to use the adjustable length torque shaft 106 to replace the counterbalance mechanisms in existing system because of its flexibility and easy installation.

At step 1304, the torsion springs 104 should be positioned on the outer torque shafts 108 as shown in FIG. 9. The torsion spring 104 is operably fixed to the torque shaft 106 via the winding cone 126 and can the opposite end of the torsion springs 104 can be fixed to the bearing housing. In embodiments, steps 1304 through 1308 are performed at the manufacturer or at the distributor rather than at the final installation of the counterbalance mechanism 100. The assembled counterbalance mechanism 100 with adjustable length torque shaft 106 can be shipped as assembled and ready for installation onto the mounting brackets. In other embodiments, the counterbalance mechanism 100 can be shipped with the middle and outer torque shafts 108 disassembled, but the torsion spring 104, bearing housing and cable drum 112 already installed on the outer torque shafts 108.

At step 1306, a cable drum 112 is fixed to the distal end of each outer torque shaft 108 such that when the outer shafts are positioned over the doorway, the cable drums 112 will be adjacent to the sides of the doorway, leaving the doorway itself clear. Each of the cable drums 112 are connected to the outer torque shafts 108 so that the cable drum 112 will rotate along with the outer shaft to which it is connected. Again, this step can be performed at the manufacturer or distributor in advance of installation in the doorway.

At step 1308, the adjustable length torque shaft 106 is assembled from the middle shaft and each of the outer shafts. The flanged bushings 124 are positioned on the middle shaft to control the amount of the middle shaft that is inserted into each of the outer shafts. By controlling the length inserted, the length of the overall shaft is controlled. Once the flanged bushings 124 are positioned, the middle shaft is inserted between the two outer shafts and the adjustable length torque shaft 106 is assembled. An embodiment of the assembled shaft is shown in FIGS. 1 and 3 and is ready to be attached to the mounting brackets 118. Alternatively, the embodiment of the counterbalance mechanism 100 can be pre-assembled by the manufacturer. The installer can simply adjust the position of the flanged bushing 124 to customize the length of the torque shaft 106 for installation on a particular lift door 102.

At step 1310, the adjustable length torque shaft 106 can be lifted into place and positioned in the mounting brackets 118 above the doorway. As discussed with respect to FIG. 11, the bearing housing can be fixed to the mounting bracket via bolts or other means to secure one end of each torsion spring 104. In this embodiment, the connection between the end cone and the mounting bracket is what makes the outer end of the torsion spring 104 operably fixed.

In step 1312, in this embodiment, an end of a cable would be attached to each cable drum 112 and at step 1314 the other end of each of the cables 114 is attached to the respective side of the lift door 102.

Finally, at step 1316, the winding cone 126 is be tightened to adjust the cable tautness and tension on the spring to properly counterbalance the weight of the lift door 102.

Figure 14:
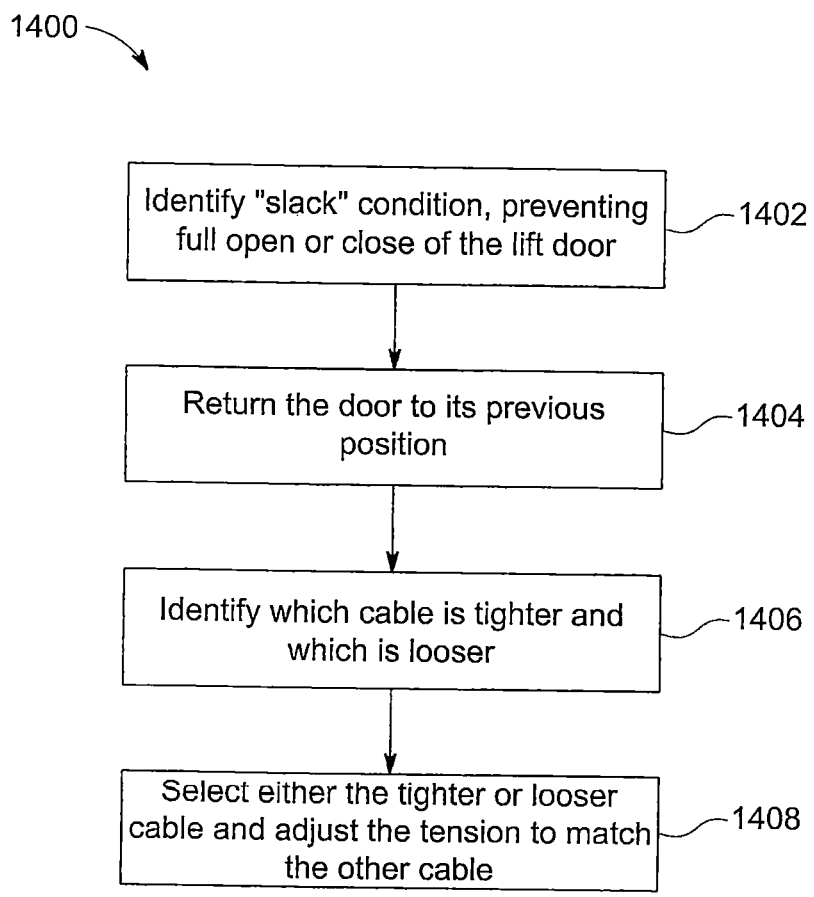
FIG. 14 is a flowchart illustrating a method for fixing a slack problem in a lift door system.

Referring now to FIG. 14, an embodiment of a method for correcting a slack problem in a counterbalance system is depicted. At step 1402, the slack problem or condition is identified. When the door 102 is raised or lowered, it can be apparent that the tension on the two cables 114 is unequal, and that one cable is longer than the other. This condition can prevent the lift door 102 from fully opening or closing. Once the slack problem is identified, the lift door 102 can be returned to its previous position at step 1404, and the loose cable and the shorter cable can be identified at 1406. The operator can elect to either tighten the loose cable or loosen the overly taut cable by rotating the winding cone 126 associated with the spring to which the selected cable is connected. Rotating the cone will rotate the selected torsion spring 104 and the outer torque shaft 108 to which it is attached. Rotating the outer torque shaft 108 will in turn rotate the cable drum 112, spooling or unspooling the cable. Because the outer torque shaft 108 on one side is rotatably decoupled from the other outer torque shaft 108, the slack the cable can be shortened on one side without effecting the length of the cable on the other side. Because the two outer shafts are capable of rotating independent of each other, the tension on one side can be adjusted to match the other side at step 1408.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A counterbalance mechanism for a lift door system, comprising:
   an adjustable length torque shaft positionable above a lift door, wherein length of the torque shaft is selected to extend at least proximate to a width of the lift door;
   two cable drums mounted proximate to opposite ends of the adjustable length torque shaft for rotation with the torque shaft, the cable drums supporting flexible cables that connect to the lift door to support at least a portion of weight of the lift door; and
   two torsion springs disposed around the adjustable length shaft and operably connected to the adjustable length torque shaft, wherein the two torsion springs exert a torsional force on the adjustable length torque shaft to counterbalance at least a portion of the weight of the lift door and assist in movement of the lift door, where each of the torsion springs are anchored to a mounting bracket; and
   wherein the adjustable length torque shaft comprises a plurality of shaft lengths, wherein the shaft lengths are assembled end to end to form the adjustable length torque shaft.

2. The counterbalance mechanism of claim 1, wherein the adjustable length torque shaft comprises:
   a first outer shaft and a second outer shaft, where one of the two torsion springs is disposed on each of the first and second outer shafts; and
   a middle shaft that connects the first outer shaft to the second outer shaft, wherein the middle shaft overlaps the first and second outer shafts to define a length of the adjustable length torque shaft.

3. The counterbalance mechanism of claim 2, wherein the first outer shaft and the second outer shaft have substantially similar diameters and the middle shaft has a diameter that is smaller than that of the first and second outer shafts so that a portion of the middle shaft inserts into the first and the second outer shafts.

4. The counterbalance mechanism of claim 3, further comprising:
   a flanged bushing positioned on the middle shaft that controls distance the middle shaft is inserted into the first outer shaft to define the length of the adjustable length torque shaft.

5. The counterbalance mechanism of claim 2, further comprising at least one bearing assembly attached to the adjustable length torque shaft.

6. The counterbalance mechanism of claim 2, wherein the first outer shaft and second outer shaft are rotatably decoupled.

7. The counterbalance mechanism set forth in claim 2 wherein the outer shafts are configured to rotate independently of one another, so that the cable drums are capable of rotating independently to reduce slack in at least one of the flexible cables.

8. The counterbalance mechanism set forth in claim 2, wherein the outer shafts are configured to rotate in unison.

9. A counterbalance mechanism for a lift door system, comprising:
   an adjustable length torque shaft positionable above a lift door, wherein length of the torque shaft is selected to extend at least proximate to a width of the lift door;
   the adjustable length torque shaft including:
      a first outer shaft and a second outer shaft;
   the adjustable length torque shaft further including:
      a middle shaft that connects the first outer shaft to the second outer shaft, wherein the middle shaft overlaps the first and second outer shafts to define a length of the adjustable length torque shaft;
   two cable drums mounted proximate to opposite ends of the adjustable length torque shaft for rotation with the torque shaft, the cable drums supporting flexible cables that connect to the lift door to support at least a portion of weight of the lift door; and
   two torsion springs disposed around the adjustable length shaft and operably connected to the adjustable length torque shaft, wherein the two torsion springs exert a torsional force on the adjustable length torque shaft to counterbalance at least a portion of the weight of the lift door and assist in movement of the lift door.

10. The counterbalance mechanism of claim 9, wherein an end of each of the torsion springs are anchored to one of a set of mounting brackets, and the mounting brackets are fixed proximate to a top of the lift door.

11. The counterbalance mechanism of claim 9, wherein the first and second outer shafts are configured to rotate independently of one another, so that the cable drums are capable of rotating independently to reduce slack in at least one of the flexible cables.

* * * * *